United States Patent
Center et al.

(10) Patent No.: US 6,453,156 B1
(45) Date of Patent: Sep. 17, 2002

(54) SCANNING RADIO RECEIVER FOR A WIRELESS COMMUNICATION SYSTEM

(75) Inventors: Stephen Douglas Center, Cary; Yngve Kenneth Wallstedt, Chapel Hill, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/160,130

(22) Filed: Sep. 24, 1998

(51) Int. Cl.$^7$ ................................................ H04Q 7/20
(52) U.S. Cl. ................ 455/161.3; 455/161.1; 455/226.3
(58) Field of Search ............ 455/67.1, 63, 67.6, 455/502, 509, 512, 513, 522, 71, 423, 450, 422, 434, 436, 438, 439, 442, 446, 115, 126, 20, 21, 226.3, 23, 42, 421, 161.1, 161.3; 375/343, 245, 340, 346; 370/331, 332, 336, 356, 342

(56) References Cited

U.S. PATENT DOCUMENTS 5,260,943 A    11/1993   Fortaw et al.
5,465,405 A  * 11/1995   Baseghi et al. .............. 375/343
5,519,759 A  *  5/1996   Heineck et al. .............. 455/422
6,330,450 B1 * 12/2001   Wallstedt et al. ............ 455/115

FOREIGN PATENT DOCUMENTS

| EP | 0 406 186 A | 1/1991 |
| WO | WO 91 07831 A | 5/1991 |
| WO | WO 96 35309 A | 11/1996 |
| WO | WO 98 00992 A | 1/1998 |

* cited by examiner

Primary Examiner—Nay Maung
Assistant Examiner—Jean A Gelin
(74) Attorney, Agent, or Firm—Coats & Bennett, P.L.L.C.

(57) ABSTRACT

A method for use in a receiver in a time division multiple access (TDMA) wireless communication system to determine whether a channel is occupied and whether the transmitter occupying the channel is internal or external to the system. The method comprises the steps of receiving a signal, on a channel determining that the channel is unoccupied when the signal strength of the channel signal is below a threshold, determining that the transmitter is internal to the system when the received signal is highly correlated to a signal that is known to contain the proper predefined field.

23 Claims, 5 Drawing Sheets

SCANNING RADIO RECEIVER FOR A WIRELESS COMMUNICATION SYSTEM

FIELD OF THE INVENTION

This invention relates to the field of wireless communication, and, more specifically, to the area of determining whether a transmitter transmitting on a channel of the wireless system is internal to the wireless communication system.

BACKGROUND OF THE INVENTION

A wireless communications system is designed to cover a large geographic area that supports numerous mobile stations. Recently, some of these large systems are being used as a foundation for smaller systems, such as a wireless office (herein "indoor system"). One such indoor system employs time-division multiple access (TDMA) technology to deliver an indoor communication environment that is flexible (especially in comparison to wireline networks) and compatible with existing digital wireless networks (herein "outdoor system").

An outdoor TDMA system achieves economy of scale by dividing the geographic coverage region into "cells." In each cell, each operational frequency is divided into timeslots, whereby multiple users share the same frequency by broadcasting only during the assigned timeslot. A frequency and a timeslot are reused from cell to cell over the geographic region—carefully engineered using distance and topography to keep wireless units in different cells from interfering with each other. Some overlap does occur, however, even with such careful planning. Therefore, the TDMA system assigns a "color code" to each mobile station. The transmitter of the mobile station encodes and sends this color code with other content in every timeslot. The receiver can then uniquely identify the transmitting mobile station when it decodes the content of the timeslot.

To achieve the capacity necessary to support the communication needs of an indoor system, both frequency reuse and TDMA technology are employed. An indoor network may be conceptually one large "cell" with only one control channel. Speech quality is improved by having a number of radio heads distributed throughout the coverage area. The radio heads use low-power transmitters, so that other radio heads throughout the indoor network can reuse channels.

In one example, indoor networks allocate channels by setting up a dynamic list of the "best" frequencies and timeslots within each frequency. "Best" is defined as those channels that have the least interference from sources outside of the indoor network (generally the nearest outdoor system).

Further, as a mobile station moves around in the coverage area, the indoor system changes the radio head that the mobile station is communicating with by doing handoffs. The indoor system tries to use the same channel after the handoff as before, thus eliminating the requirement that the mobile station re-tune, as is commonly done during handoffs. This type of handoff is seamless to the mobile station, and is often referred to in literature as Soft Handoff. A prerequisite for soft handoff is that the radio heads are synchronized with each other.

The scanning receivers, potentially at each radio head, provide measurements to be used both for channel allocation and handoff decisions. The measurements could consist of received signal strength, and some sort of identity of the signal (if it is from an external interferer or from a mobile station within the office system) for each measured channel. For handoff purposes, the system verifies that the "new" radio head's scanning receiver is receiving the correct mobile (signal is from the mobile station involved in the handoff, and not some other signal) by checking the identity of the signal. For channel allocation purposes, the source of a signal is used to see if a channel is in use within the system or not.

Current scanning receivers, however, cannot accurately identify whether the source of a signal on a channel is internal or external to the system without decoding the content of each timeslot and examining the color code to determine whether the color code belongs to the indoor system. Completely decoding the content of a time slot requires demodulation, data detection and color code decoding. This requires fast, complex processors, program memory space and memory data space; all of which are contrary to the requirements of a small, inexpensive indoor system. On the other hand, energy at or above a threshold at synchronization (or other) symbols in the timeslot can not indicate whether the source of the signal is internal or external to the system.

SUMMARY OF THE INVENTION

According to a first aspect of this invention, a method is disclosed for use in a wireless communication system having a plurality of internal transmitters transmitting on a plurality of channels. The method determines whether a signal on a channel is being transmitted by a transmitter internal to the system. The method comprise the steps of receiving the signal being transmitted by a transmitter on a channel and determining a degree of correlation between a predefined field in the signal and a model of a predefined field in a signal transmitted by a transmitter synchronized the system. A determination is made that the transmitter of the signal is internal to the system if the degree of correlation is high.

According to a further aspect of this invention, the step of determining the degree of correlation comprises determining the degree of correlation between the predefined field and the signal over a predefined frequency range and a model of a predetermined field of the signal transmitted by a transmitter synchronized to the system. According to a further aspect of this invention, the step of determining the degree of correlation comprises determining the degree of correlation between the predefined field and the signal over a predefined time offset and a model of a predefined field as if the predefined field were transmitted by a transmitter synchronized the system.

According to a further aspect of this invention, a scanning radio in a wireless telephone system measures a signal's strength and phase of symbols and determines whether the signal's transmitter is internal or external to the system. The signal has a plurality of timeslots each having one or more predefined fields. The scanning receiver comprises a controller communicating with the wireless system and a variable frequency tuner. The variable frequency tuner includes a tunable receiver to receive a timeslot of a signal on one of a plurality of frequencies selected responsive to the controller. The receiver changes the frequency of the signal to an intermediate frequency and measures the signal's strength.

This aspect of the invention also includes a quantitizer configured to sample the signal strength measurement and to quantitize each sample of the signal strength and a sampling device configured to sample the intermediate frequency signal and to derive a mathematical representation of the phase of the signal in each sample. The inventive receiver also includes a memory containing a stored list of mathematical representations of the phases and signal strengths of samples of the predefined fields.

This invention also includes a comparator that determines whether the transmitter of the signal is internal or external to the system by determining whether there is a high correlation between the mathematical representation of the phase of the signal in each sample and one of the stored list of mathematical representation of the phases. The comparator includes means for comparing the mathematical representation of the phase and the signal strength of a predetermined plurality of signal samples to the stored list of mathematical representations of phases and signal strengths of the unique synchronization words, wherein the transmitter of the signal is internal to the system if there is a high correlation.

BRIEF DESCRIPTION OF THE DRAWINGS

A more complete understanding of this invention may be obtained from a consideration of the following detailed description in conjunction with the drawings, in which.

DETAILED DESCRIPTION

All mobile stations within a control area are synchronized to the same clock. The present invention makes use of this synchronization to improve the efficiency of determining whether a received signal originated from a wireless communications device controlled by the system or whether the signal originated from a different system, without having to fully decode the content of the signal in order determine the color code.

Figure 1:
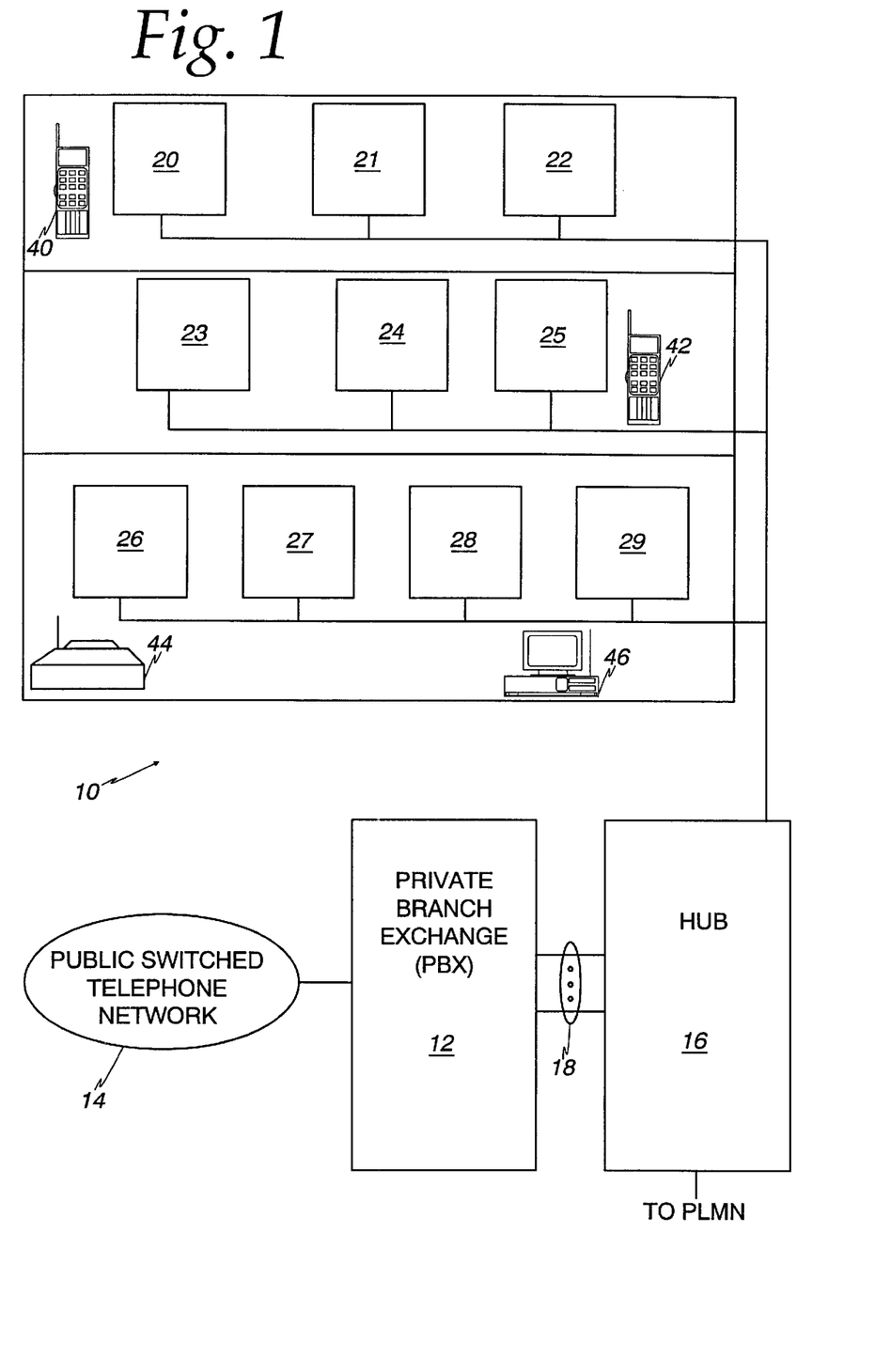
FIG. 1 is a block diagram of a wireless office system that employs a scanning receiver according to an exemplary embodiment of this invention.

FIG. 1 is a block diagram of a wireless office system 10 that uses a scanning receiver according to an exemplary embodiment of this invention. A wireless office of this nature is discussed in S. Broddner, M. Lilliestrale and K. Wallstedt, *Evolution of Cellular Technology for Indoor Coverage,* presented at the International Symposium on Subscriber Loop Services, 1996, which is incorporated herein by reference in its entirety. Of course, a scanning receiver in accordance with the principals of this invention may be employed in any wireless system (indoor or outdoor) that measures signal strength and/or determines whether a transmitter is internal or external to the system.

The wireless office system 10 generally includes a private branch exchange (PBX) 12 as a switching center. The PBX 12 receives calls from, and sends calls to, the public switched telephone network (PSTN) 14, as known in the art. The PBX 12 is connected to a hub 16 by a plurality of lines 18. The hub 16 controls and coordinates the wireless connections among a plurality of radio heads 20–29 and various wireless communications devices, represented by wireless telephones 40 and 42, wireless fax machine 44 and wireless modem 46.

The hub 16 provides communications over the area covered by its radio heads 20–29 as if it were one cell with one common control channel from the outdoor wireless paradigm. Two or more radio heads 20–29 can be used for the downlink transmission and uplink reception when possible, because improved reception is gained on the traffic channels. An adaptive antenna selection scheme decides which radio heads are best suited to serve each mobile station, based on received signal quality, and the signal is not transmitted where it is not needed. The radio heads do not have to be the same for uplink and downlink. For example, the radio heads 20 and 21 are used for downlink transmission from the wireless telephone 40, and the radio heads 21 and 24 are used for uplink transmission.

The hub 16 switches the active radio heads as a mobile station moves around in the cell area. Preferably, a soft handoff is used to change the radio heads where possible. A soft handoff is one without any change of channels, without informing the mobile station about the event, and without being detectable by the user. A conventional "hard" handoff will also occur if the same channel is not available after an inter-radio head handoff (e.g., due to limitations in hardware availability).

An adaptive channel allocation scheme determines which traffic channel is best for each connection based on measurements of co-channel interference. It is then possible to assign a traffic channel (one frequency and one time slot) to multiple mobiles in the cell, further increasing the system capacity by frequency reuse. In the example of FIG. 1, if wireless telephone 40 and wireless telephone 42 (and their serving radio heads) are distant enough not to interfere with each other, they can use the same channel although they are within the same cell. If one of the mobiles moves towards the other, the interference increases, and one of the mobiles is ordered by the hub 16 to change to another channel.

Figure 2:
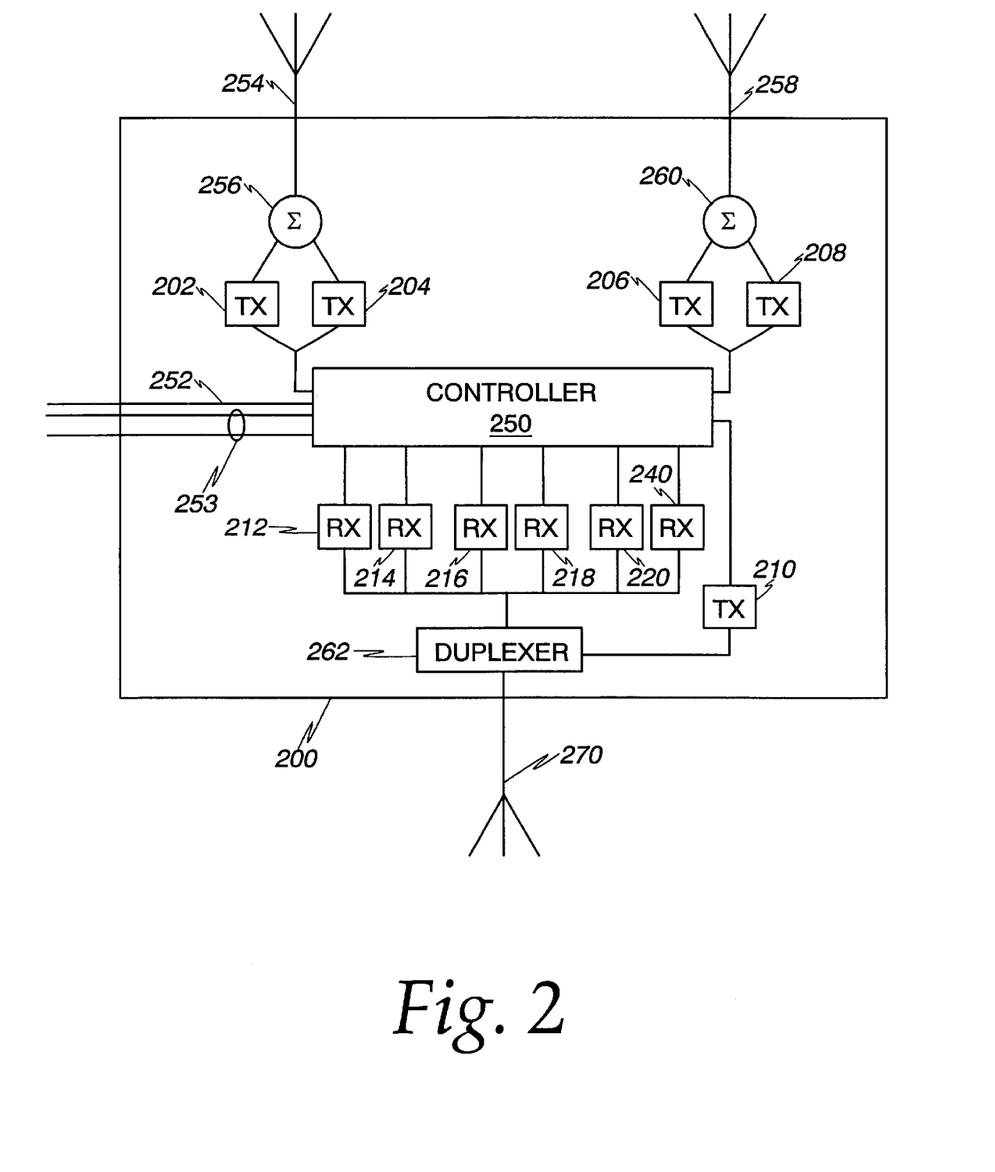
FIG. 2 is a block diagram of a radio head of the wireless office of FIG. 1.

Turning now to FIG. 2, a radio head 200 having a scanning receiver according to the exemplary embodiment of this invention is shown. The radio head 200 includes, in this exemplary embodiment, five transmitters 202, 204, 206, 208 and 210, and receivers 212, 214, 216, 218 and 220. A scanning receiver 240 according to the exemplary embodiment of this invention is connected to a controller 250. The controller 250 is connected to the hub 16 by a control line 252 and a plurality of two-way communication channels 253. Transmitters 202 and 204 are connected to antenna 254 by way of multiplexer 256. Transmitters 206 and 208 are connected to antenna 258 by way of multiplexer 260. Receivers 212, 214, 216 218, 220 and scanning receiver 240 are connected to duplexer 262. Transmitter 210 is also connected to duplexer 262. Duplexer 262 facilitates transmitter 210 to transmit and receivers 212, 214, 216, 218 220, and 240 to receive over antenna 270.

Radio head 200 provides connections to wireless communications devices via transmitters 202, 204, 206, 208 and 210 and receivers 212, 214, 216, 218 and 220. The 20 radio signals are translated to/from an analog or digital stream usable in switching in controller 250. Scanning receiver 240 provides information regarding channel occupancy and noise to the hub 16, to aid in decisions regarding channel assignment, channel handover and the like.

Figure 3:
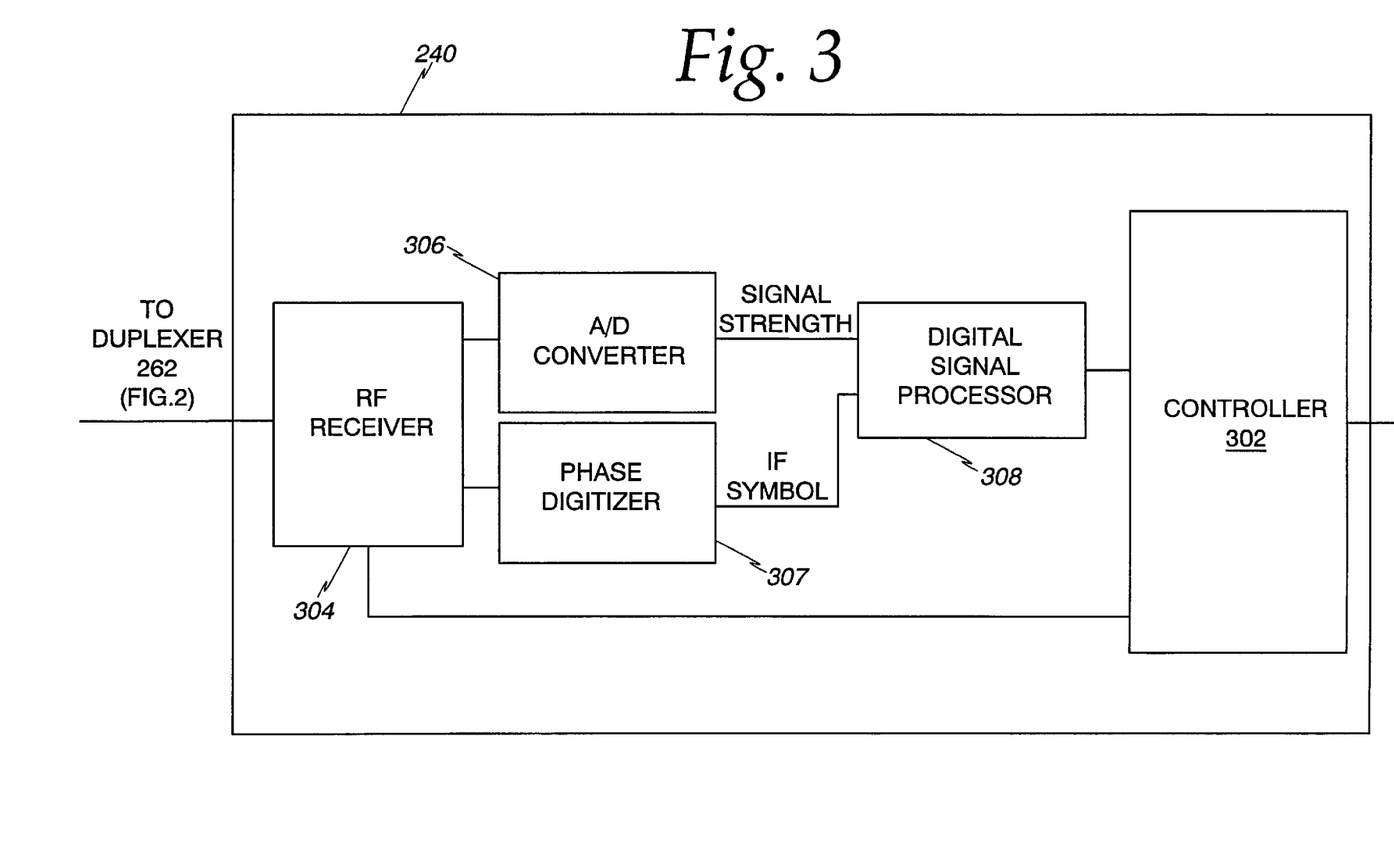
FIG. 3 is a block diagram of a scanning receiver according to an exemplary embodiment of this invention.

Turning now to FIG. 3, the scanning receiver 240 according to an exemplary embodiment of this invention includes a controller 302 that first receives a command from the system controller (250, FIG. 2) to determine the signal strength on a frequency and determine whether the signal is from a user of the system or whether the frequency is being used by a system outside of the wireless office (such as an outdoor wireless network, or a wireless network from an adjoining office building). Processing starts when the controller 302 causes a radio frequency (RF) tuner 304 to tune to a specific frequency. The RF tuner 304 captures a signal at the requested frequency and timeslot of the signal. The RF tuner 304 changes the frequency of the signal to an intermediate frequency. By changing the frequency of the signal from the original frequency to an intermediate frequency the scanning receiver can perform its functions on all signals at a common frequency, so that it does not have to operate at all of the possible frequencies of the wireless system.

The RF tuner 304 delivers the signal strength measurement to an Analog-to-Digital converter (A/D converter) 306. The A/D converter 306 acts as a quantitizer in that it samples the signal strength and derives a magnitude measurement for each of the signal strength samples. The RF receiver 304 delivers the content of the signal at the intermediate frequency to a phase digitizer 307 that is configured to sample the intermediate frequency signal and derive a mathematical representation of the phase of the signal in the sample. In this exemplary embodiment, each sample is described in terms of phase angle of the signal.

A digital signal processor (DSP) 308 receives the quantitized signal strength samples and the phase angle samples of the signal. The DSP 308 acts as a comparator to determine if the signal was transmitted from within the system or outside of the system. To this end, since the internal system is a low power system, it is assumed that all transmitters internal to the system are nearby. As a result, there should be little or no frequency shift or time shift in signals transmitted by internal transmitters. Therefore, the system looks for a predefined field, such as a synchronization word, in the timeslot of interest to determine if the predefined field was received within a frequency range and time period in which it was expected (i.e., the common air frame synchronization reference in the system). The time period is measured in a number of symbols within which the predefined field should start.

The DSP 308 contains a stored list of mathematical representations and signal strengths of samples of the expected synchronization words for each time slot. A comparator then determines whether the transmitter of the signal is internal or external to the system by determining whether, in this exemplary embodiment, the synchronization word is present in the signal, by comparing the signal strength and the mathematical representation (preferably in complex IQ representation) of the phase of a predetermined plurality of signal samples from the timeslot of the signal to the stored list of mathematical representations and signal strengths of the unique synchronization words, wherein the transmitter of the signal is internal to the system if one of the proper synchronization words is present.

To this end, DSP 308 performs the comparison several times. It varies the phase angle offset and tests for the presence of the synchronization word in all of the allowed time offset position. The maximum value after the subtraction, if it is above a threshold, is deemed an inside transmitter. If the synchronization word is not found, then the transmitter is an outside transmitter. This information is delivered to the controller 302, which sends it on to the hub 16.

Figure 4:
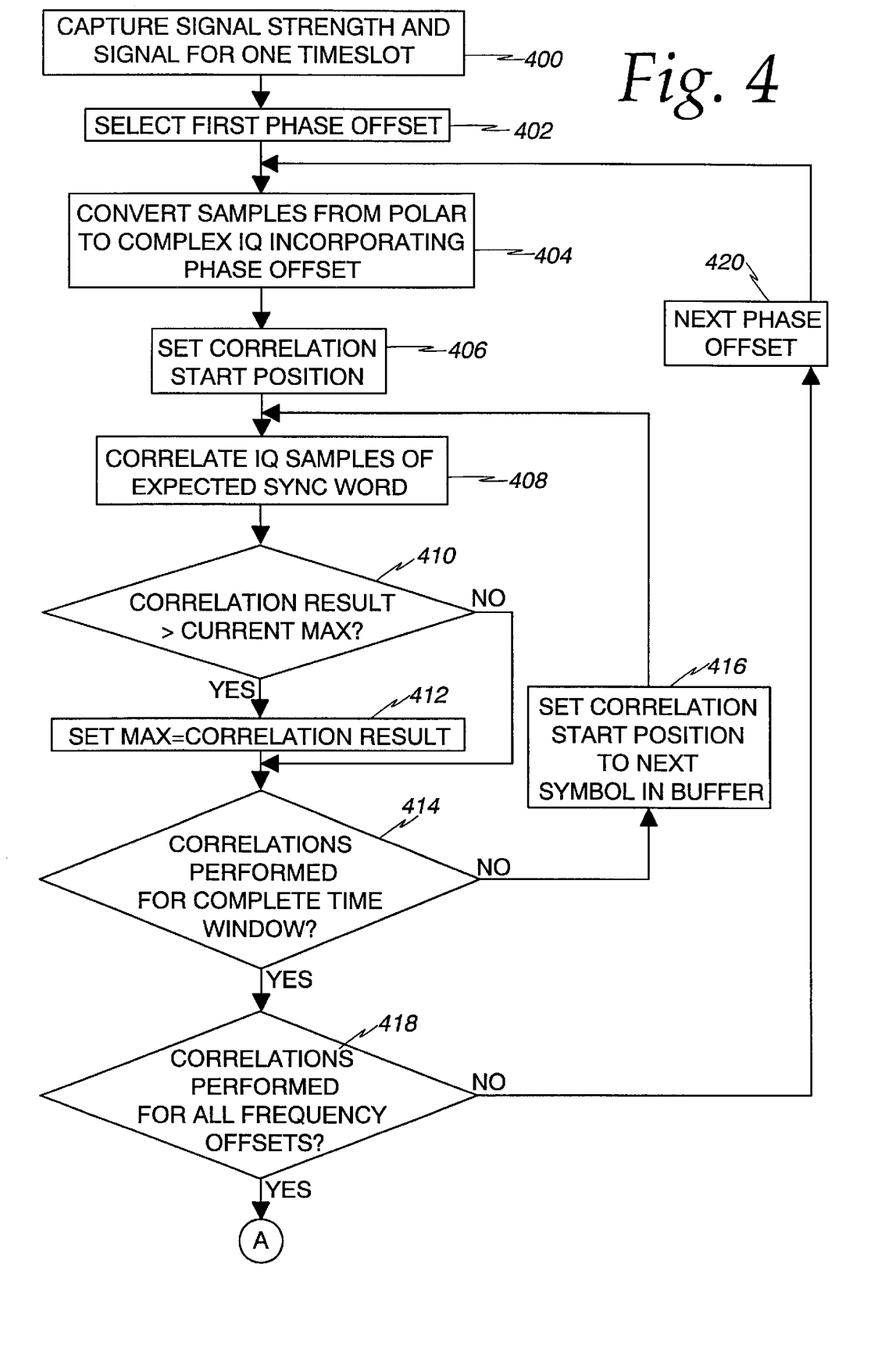
FIGS. 4 and 5 are flowcharts of operation of a scanning receiver according to an exemplary embodiment of this invention.
Figure 5:
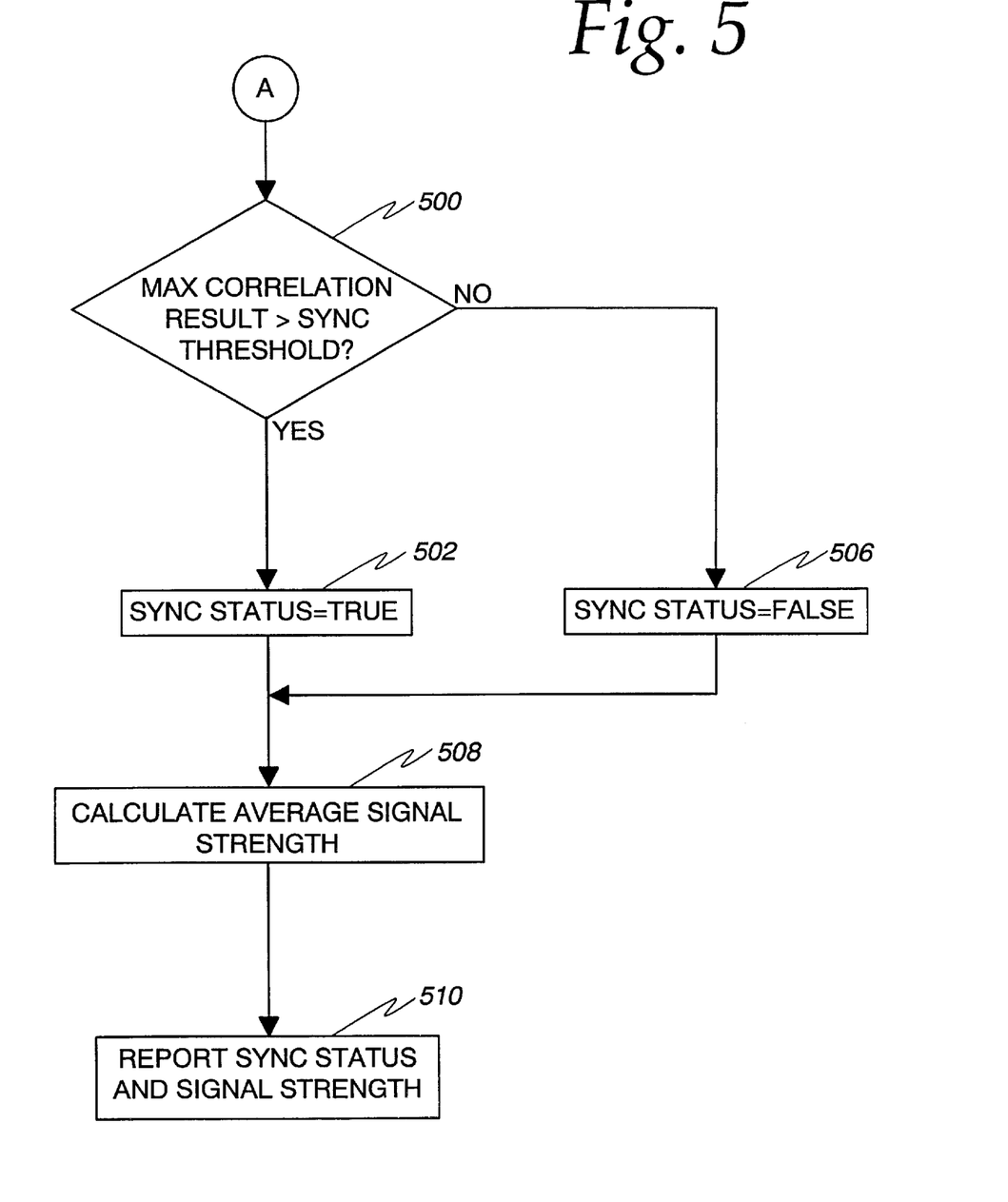

Turning now to FIGS. 4 and 5, processing according to an exemplary method as practiced in scanning receiver 240 is described. Processing starts in a box 400, where the RF receiver captures the signal strength and the samples for one timeslot. Processing proceeds to the box 402, where the phase offset for the allowed frequency drift is obtained. In a box 404, the samples are converted from polar to complex representation incorporating the phase offset. Processing continues in box 406, where the correlation start position is initialized to the earliest possible time (symbol) that could have been received.

Processing proceeds to box 408, where the received IQ data is correlated against the stored samples of the IQ representation of the expected sync word. In decision diamond 410, a determination is made whether the correlation made in box 408 is greater than any earlier correlation. If it is, then processing proceeds to box 412, where the result is stored. If the correlation is not greater than any earlier correlation and from box 412, then processing proceeds to decision diamond 414 where a determination is made whether correlations have been made for the entire time window. If not, then processing moves to box 416, where the correlation start position is set to the next sample in the buffer.

If, in decision diamond 414, correlations have been made for the entire time window, then processing proceeds to decision diamond 418, where a determination is made whether correlations have been made for all frequency offsets. If not, then processing proceeds to box 420, where the phase offset for the next presumed frequency offset is obtained. Processing loops back to box 404.

If, in decision diamond 418, correlations have been performed for all of the frequency offsets, then processing proceeds through connector A to FIG. 5, In FIG. 5, processing begins in decision diamond 500, where a decision is made whether the maximum correlation result is greater than a threshold. If it is, then an internal transmitter has been found and processing moves to box 502 where a sync status is set to true. If, in decision diamond 500, the maximum correlation result is not greater than a threshold, then the signal is deemed to be from outside the system, and the sync status is set to false in box 506. Processing continues from both boxes 502 and 506 to box 508, where the average received signal strength is calculated. The sync status and the average received signal strength is reported to the controller in box 510, where processing ends.

It will therefore be apparent that the invention economically, simply and rapidly provides a determination of whether a signal originated from a wireless communications device controlled by the system or originated from another system. Consequently, the need to fully decode a signal is avoided and a scanning receiver for an indoor wireless system does not require high speed processors and large amounts of memory. It will further be appreciated that the invention may be used in any receiver in any wireless system where all or most of the transmitters are time synchronized.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A method for use in a wireless communication system having a plurality of internal transmitters transmitting on a plurality of channels, for determining whether a signal on a channel is being transmitted by a transmitter internal to the system, the signal having a predefined field, said method comprising:

receiving the signal being transmitted by a transmitter on a channel;

determining a degree of correlation between the predefined field in the signal and a model of a predefined field of a signal transmitted by a transmitter synchronized to the system; and determining that the transmitter of the signal is internal to the system if the degree of correlation is high.

2. The method of claim 1 wherein the step of determining the degree of correlation includes determining the degree of correlation between the predefined field in the signal over a predefined frequency range and a model of a predefined field of a signal transmitted by a transmitter synchronized to the system.

3. The method of claim 1 wherein the step of determining the degree of correlation includes determining the degree of correlation between the predefined field in the signal over a predefined time offset and a model of a predefined field of a signal transmitted by a transmitter synchronized to the system.

4. The method of claim 1 wherein the step of determining the degree of correlation includes determining the degree of correlation between the predefined field in the signal over a predefined frequency range and a predefined time offset and a model of a predefined field of a signal transmitted by a transmitter synchronized to the system.

5. A method of claim 1 further including the step of determining a signal strength of the signal and wherein the step of determining that the transmitter of the signal is internal to the system also includes determining that the signal strength is above a threshold.

6. The method of claim 1 wherein the step of determining a degree of correlation comprises comparing a phase angle of the signal to a model of a phase angle of the predefined field of a signal transmitted by a transmitter synchronized to the system.

7. The method of claim 6 wherein each channel comprises a frequency and a timeslot on the frequency and the predefined field comprises a predefined location in the timeslot and wherein the step of determining a degree of correlation comprises comparing a phase angle at the predefined location of the signal's timeslot to a model of a phase angle of the predefined field of a signal transmitted by a transmitter synchronized to the system.

8. A scanning radio receiver for use in a wireless telephone system to measure a signal's strength and determine whether the signal's transmitter is internal or external to the system, said signal having a plurality of timeslots each having a predefined field, said scanning receiver comprising:

a variable frequency tuner having a tunable receiver to receive a timeslot of a signal on one of a plurality of frequencies and having means for measuring the signal's strength and means for changing the frequency of the signal to an intermediate frequency;

a quantitizer configured to sample the signal strength measurement and to quantitize each sample of the signal strength;

a sampling device configured to sample the intermediate frequency signal and to derive a phase of the signal in each sample;

a memory containing a stored list of phases and signal strengths of samples of the predefined field; and a comparator configured to determine whether the signal's transmitter is internal or external to the system by determining whether the predefined field is present in the signal, said comparator including means for comparing the signal phase and the signal strength of a predetermined plurality of signal samples from the timeslot of the signal to the stored list of signal phases and signal strengths of the predefined field, wherein the transmitter of the signal is internal to the system if the phase of the signal is sufficiently similar to the stored list of signal phases.

9. A scanning radio receiver in accordance with claim 8 wherein said comparator is further configured to convert the phase angle and signal strength of the predetermined plurality of signal samples to complex IQ representation and wherein said stored list of mathematical representations and signal strengths of the unique synchronization words comprise complex IQ representations, said comparator being configured to correlate the complex IQ representation of the signal to the complex IQ representations of the predefined field to determine whether the predefined field is present in the signal based upon the degree of correlation of the two signal representations.

10. A scanning radio receiver in accordance with claim 9 wherein said comparator is further configured to add a phase angle offset to each of the plurality of samples.

11. A scanning radio receiver in accordance with claim 10 wherein said comparator is configured to repeatedly compare the complex IQ representation of said plurality of signal samples to the predefined field a plurality of times, using a different phase angle offset each repetition.

12. A scanning radio in accordance with claim 8 wherein said samples of said signal comprise a plurality of symbols, said predefined field comprises a group of adjacent symbols, and said comparator being further configured to start said correlation at a predetermined time prior to the expected start of the adjacent symbols.

13. A scanning radio in accordance with claim 8 wherein said samples of said signal comprise a plurality of symbols, said predefined field comprises a group of adjacent symbols, and said comparator being further configured to repeatedly correlate starting at a different one of said samples on each repetition.

14. A scanning radio in accordance with claim 13 wherein said comparator only converts a portion of said sampled symbols in the vicinity of said synchronization word in said time slot.

15. A scanning radio in accordance with claim 8 wherein said comparator reports that a transmitter is internal to the system if the correlation exceeds a predetermined threshold.

16. A method for use in a scanning radio receiver for determining source and strength of a signal on a predefined frequency, said method comprising:

tuning to the predefined frequency;

converting a signal on the predefined frequency to an intermediate frequency;

determining a signal strength for the signal;

determining a phase of the signal at the intermediate frequency;

comparing the phase of the signal to an expected phase of a synchronization word; and reporting the signal strength and the result of said comparison.

17. A method in accordance with claim 16 wherein the step of determining a phase of the signal at the intermediate frequency comprising sampling the signal and determining a phase angle for each sample.

18. A method in accordance with claim 17 further including the step of converting the signal strength and phase angle for each sample to a complex mathematical notation, and the step of comparing comprises comparing the complex mathematical notation of the plurality of symbols to a complex mathematical notation of the expected synchronization word.

19. A method in accordance with claim 18 wherein the step of comparing further includes adding a phase angle offset to each sample to allow for frequency drift of the signal.

20. A method in accordance with claim 18 wherein the step of comparing further includes adding a one of consecutive range of phase angle offsets to each sample to allow for frequency drift of the signal, and comparing the complex mathematical notation to the complex mathematical notation of the expected synchronization word signal, adding a different one of said range of offsets to each sample and comparing again.

21. A method in accordance with claim 16 wherein said expected synchronization word in said signal comprises an adjacent group of symbols, and said step of comparing comprises starting with a group of symbols within a predetermined number of symbols from the expected location of the expected synchronization word, and repeatedly comparing the complex mathematical notation of the signal to the expected synchronization word signal, starting with a different sequential symbol each time.

22. A scanning receiver for use in a wireless telephone system to measure a signal's strength and to determine whether the signal's transmitter is synchronized to the system, said signal including a plurality of timeslots comprising a plurality of encoded symbols, each of said plurality of timeslots having a synchronization word comprising a predefined plurality of encoded symbols, said scanning receiver comprising:
- means for measuring the signal strength of the signal;
- means for determining the phase of the predefined plurality of encoded symbols; and
- means for correlating said phase of the symbols of the signal with the phase of an expected synchronization word to determine whether the transmitter is synchronized to the system.

23. A method for use in a wireless communications system for determining whether a signal received on a predefined frequency was transmitted by a transmitter synchronized to said system, said method comprising:
- tuning to said predefined frequency;
- converting said signal on said predefined frequency to an intermediate frequency;
- determining a signal strength for said signal;
- determining a phase of said signal at said intermediate frequency;
- comparing said phase of said signal to an expected phase of a synchronization word; and
- determining based on said signal strength and said comparison, whether said signal was transmitted by a transmitter synchronized to said system.

* * * * *